(12) United States Patent
Lawrence

(10) Patent No.: US 6,287,458 B1
(45) Date of Patent: Sep. 11, 2001

(54) AUTOMATIC CHLORINATOR APPARATUS FOR WASTEWATER SYSTEMS

(76) Inventor: Jack A. C. Lawrence, 617 Abney St., St. Albans, WV (US) 25177

( * ) Notice: Subject to any disclaimer, the term of this patent is extended or adjusted under 35 U.S.C. 154(b) by 0 days.

(21) Appl. No.: 09/461,991

(22) Filed: Dec. 15, 1999

Related U.S. Application Data

(60) Provisional application No. 60/112,294, filed on Dec. 15, 1998.

(51) Int. Cl.$^7$ ...................................................... B01D 17/12
(52) U.S. Cl. ......................... 210/91; 210/198.1; 116/283; 422/264
(58) Field of Search ...................................... 116/281, 283; 137/268; 210/86, 91, 169, 198.1, 532.1, 754; 422/263, 266, 276, 278

(56) References Cited

U.S. PATENT DOCUMENTS

| | | | |
|---|---|---|---|
| 5,306,425 | * | 4/1994 | Graves .................................. 210/754 |
| 5,885,446 | * | 3/1999 | McGrew ................................. 210/91 |
| 5,932,093 | * | 8/1999 | Chulick .................................. 210/91 |
| 6,066,252 | * | 5/2000 | Reeves ................................... 210/91 |

* cited by examiner

*Primary Examiner*—Joseph W. Drodge
(74) *Attorney, Agent, or Firm*—Steptoe & Johnson PLLC

(57) ABSTRACT

An apparatus is disclosed for use in a cylindrical pipe connected to a water supply pipe wherein the apparatus uses a plurality of tablets for treating water flowing through the water supply pipe. The apparatus determines and indicates the level of the stack of tablets within the tablet cylinder. The apparatus determines the level of the stack of tablets by a status indicator rod that moves up and down according to the level of the stack of tablets. The level of the stack is indicated by a visual indicator wherein the status indicator rod moves along one or more markings. The level of the stack is also indicated by an audible and/or visual indicator such that as the status indicator rod reaches a predefined level, an electrical connection is made resulting in an alarm being triggered. The alarm may be either an audible alarm and/or a visual notification.

18 Claims, 3 Drawing Sheets

AUTOMATIC CHLORINATOR APPARATUS FOR WASTEWATER SYSTEMS

CROSS-REFERENCE TO RELATED APPLICATIONS

This application claims the benefit of U.S. Application No. 60/112,294, filed Dec. 15, 1998.

BACKGROUND OF THE INVENTION

1. Field of Technology

The present invention relates to chlorinators, and more particularly to chlorinators using chlorine tablets and incorporating a means for signaling the level of chlorine tablets remaining in a chlorinator.

2. Related Art

Conventional aerobic treatment systems are used to treat, or purify, all types of wastewater ranging from commercial applications to residential applications. These systems almost always include a chlorinator. Conventional chlorinators comprise a cylinder for storing a plurality of chlorine tablets. As wastewater passes through the chlorinator via louvers, the chlorine tablets dissolve and treat the wastewater.

The principal disadvantage with using conventional chlorinators is that the chlorinators do not have any means for indicating the level of chlorine tablets remaining in the chlorinator. Typically the chlorinator is kept filled with chlorine tablets by routine inspections wherein an inspector, or operator, must physically stop, open, and check the level of chlorine tablets remaining in a chlorinator. If an operator is late, or does not stop at all, then a chlorinator may actually be operating with no chlorine tablets. This situation is very hazardous to human health because the wastewater would be flowing through the chlorinator and into the remainder of the treatment system without receiving any treatment.

Therefore, there is a need for a chlorinator that incorporates a means for signaling the level of chlorine tablets remaining in the chlorinator so that the chlorinator does not operate with too few or no chlorine tablets. There is a further need for a chlorinator that incorporates different types of signaling systems, such as, a visual and an audio signal.

In today's world, there are numerous chlorinators being used in both commercial and residential environments—too many to count. Furthermore, many of these existing chlorinators are in difficult or hard-to-reach locations, e.g., buried in the ground or incorporated into a larger wastewater treatment system. It would be very impractical to remove these chlorinators and install a new chlorinator system.

Therefore, there is a need for a chlorinator lid assembly that can be easily adapted to work with any existing and operational chlorinator, wherein the chlorinator lid assembly incorporates a means for signaling the level of chlorine tablets in the existing chlorinator. In addition, there is a need for a chlorinator lid assembly that does not require the removal of an entire existing chlorinator to be installed.

As with chlorinators, de-chlorinators have the same problems and disadvantages associated with them. De-chlorinators operate on the same principle as chlorinators except that a de-chlorinator uses tablets to de-chlorinate water whereas a chlorinator uses tablets to chlorinate water. Therefore, there is a need for a de-chlorinator system that incorporates a means for indicating to an operator the level of tablets in the de-chlorinator.

SUMMARY OF THE INVENTION

The present invention solves the problems associated with conventional chlorinators by providing a chlorinator system having a means for indicating the level of chlorine tablets contained within the chlorinator. When the level of tablets becomes dangerously low or completely empty, the chlorinator system of the present invention indicates such status, thereby allowing an operator to replenish the supply of tablets.

The chlorinator of the present invention comprises a tablet cylinder having a top end and a bottom end. A removable lid is mounted to the top end, wherein a bottom plate is rigidly attached to the bottom end of the tablet cylinder to close it off. The tablet cylinder has a plurality of vents, or louvers, located around the circumference at its bottom end. Therefore, wastewater can filter through the chlorinator as the wastewater traverses through the system. The tablet cylinder has a first plunger and a second plunger contained therein, defining a top space, a middle space, and a bottom space. The two plungers are connected via a spring located in the middle space. A plurality of chlorine tablets are stored in the bottom space near the louvers, wherein the first plunger rests on the top-most chlorine tablet. Wastewater passing through the louvers on the side of the cylinder contacts the chlorine tablets and becomes treated. A means for indicating the amount of chlorine tablets remaining in the bottom space is connected to the first plunger. The spring exerts pressure on the chlorine tablets during treatment to keep them in place, to prevent clogging of the tablets, and to activate the means for indicating the level of chlorine tablets remaining.

In operation, as the chlorine tablets are used, the first plunger is lowered and the pressure exerted by the spring pushes both the first and second plungers down. Therefore, as the first plunger lowers in relation to the lid of the tablet cylinder, the level of chlorine tablets is indicated to an observer. In the preferred embodiment, there are two means for indicating the level of chlorine tablets. First, there is a visual mechanical means comprising one or more visual markings positioned in relation to a status indicator rod attached to the first plunger that passes through the lid of the tablet cylinder. Thus, as the first plunger lowers due to the use of the chlorine tablets, the attached status indicator rod descends and indicates with the markings the remaining level of chlorine tablets.

The second means for indicating the level of chlorine tablets is an electric system that works on the same principal of the first means. That is, as the first plunger lowers, an electrical contact is made, thereby completing an electrical circuit. Once the electrical connection is made, an audio sound (e.g. horn, buzzer), visual (lights) or electrical display indicates the low level of chlorine tablets.

In another embodiment, the present invention comprises a chlorinator lid assembly comprising the system described above without the tablet cylinder. Therefore, a user can easily adapt any conventional chlorinator to use the present invention by simply removing the existing conventional lid and replacing it with the chlorinator lid assembly of the present invention.

There are many advantages with a chlorinator of the present invention. First, the present invention provides a means wherein an operator of a wastewater treatment system can continually replenish the supply of chlorine tablets thereby ensuring that the chlorinator is never empty of tablets. If the chlorinator were to every be empty of chlorine tablets, the wastewater water would not be treated properly.

Second, the tension resulting from the use of a spring between the two plungers of the present invention prevents clogging of the tablets while treating the wastewater. That is, the weight of a plunger on the top of the stack of chlorine tablets maintains the order of the tablets as the wastewater flows through the chlorinator. Without maintaining such order, the flow of wastewater moves the chlorine tablets inside the chlorinator, resulting in a pile of tablets that clogs the louvers, thereby interfering with the flow of wastewater through the chlorinator.

Third, the preferred chlorinator of the present invention employs both a mechanical means for indicating the level of chlorine tablets as well as an electrical means. Therefore, there is a backup signaling system, ensuring that there is always a supply of chlorine tablets in the chlorinator.

Lastly, the present invention is adapted to work with conventional wastewater treatment systems. The chlorinator lid assembly of the present invention can be easily and rapidly installed on a conventional chlorinator within minutes.

The chlorinator system of the present invention is equally applicable to a de-chlorinator system or to any system involving the use of tablets. Therefore, the structure, operation and advantages of the present invention may be directly incorporated into a de-chlorinator system as well as any tablet system.

DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION OF THE PREFERRED EMBODIMENTS

Figure 1:
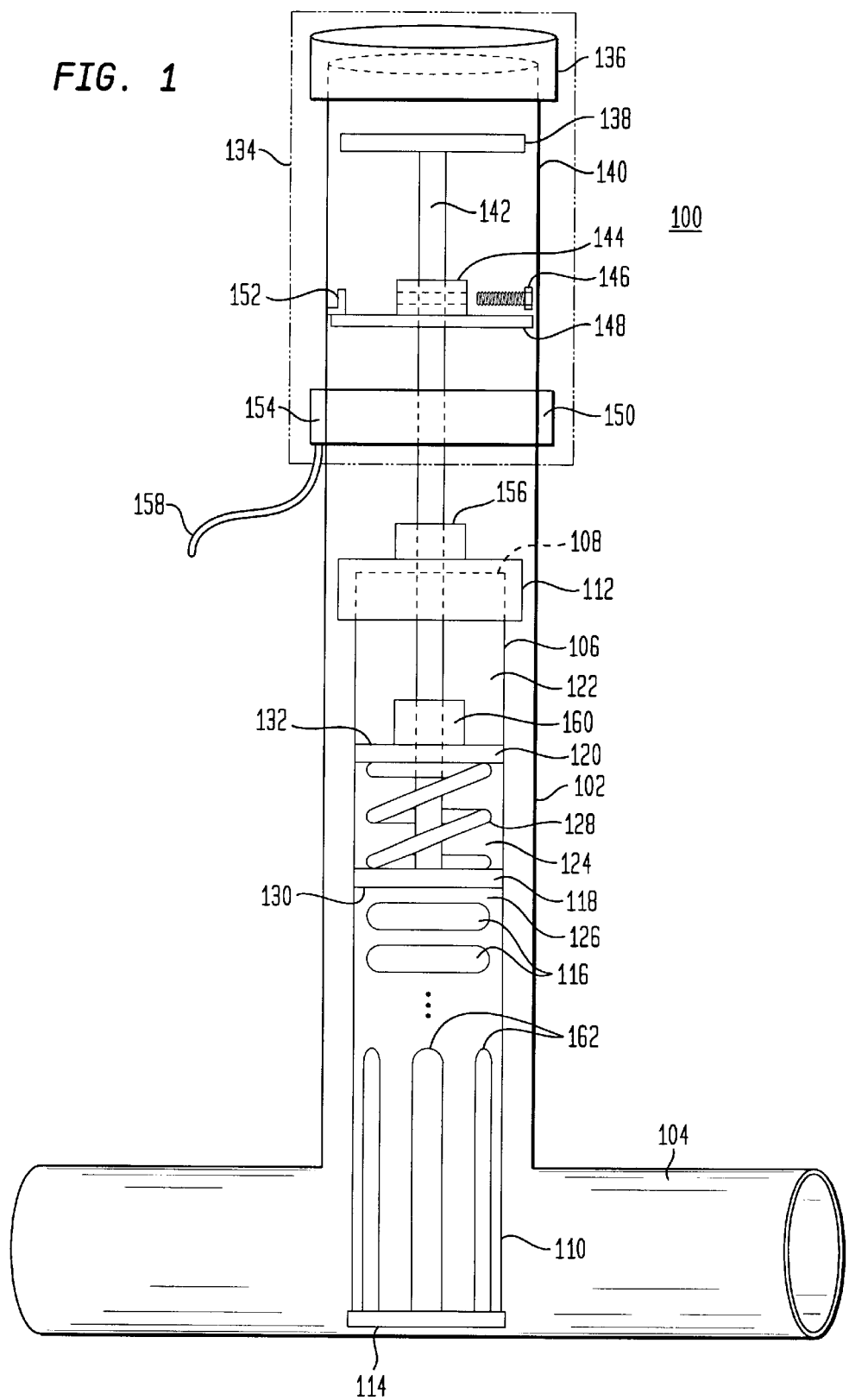
FIG. 1: A planar cross sectional side view of a chlorinator system of the present invention.

FIG. 1 shows a chlorinator system 100 of the present invention as used with a cylindrical pipe 102, about 4 inches in diameter, connected to a wastewater supply pipe 104. The chlorinator system 100 is used to treat waste water flowing through the wastewater supply pipe 104. The preferred embodiment of the chlorinator system 100 comprises a tablet cylinder 106, about 18 inches in height, having a top end 108, a bottom end 110, and a means for determining the level of a stack of chlorine tablets 116 within the tablet cylinder 106. The tablet cylinder 106 is preferably made of a malleable, non-corrosive material, e.g., 3 ½ inch diameter PVC tubing or Lexann acrylic. A removable lid 112 having a handle 156 on its top side for grasping is attached to the top end 108, wherein the lid 112 is either screwed onto or into the top end 108 of the tablet cylinder 106.

In an alternative embodiment, the top end 108 of the tablet cylinder may have a lid rest for storing the lid 112 when in the open position. A bottom plate 114 is rigidly attached to the bottom end 110 of the tablet cylinder 106 to close it off.

The tablet cylinder 106 also has a plurality of vents, or louvers, 162 located around its circumference at the bottom end 110. Although only a few louvers 162 are shown on FIG. 1 for convenience only, a plurality of louvers 162, about six, are properly spaced around the entire circumference of the bottom end 110 of the tablet cylinder 106 to ensure the proper flow of water through the tablet cylinder 106 and the proper amount of chlorine tablets 116 being dispensed. Therefore, wastewater can filter through the tablet cylinder 106 as the wastewater traverses through the chlorinator system 100. The use of louvers 162 in water treatment systems is well known in the relevant arts.

FIG. 1 only shows two chlorine tablets 116, but this also is for convenience purpose only. In operation, about six to twelve chlorine tablets 116, depending on the size of the tablet cylinder 106, would be stacked in the bottom end 110 of the tablet cylinder 106, thereby being in direct contact with wastewater that flows through the wastewater supply pipe 104 and through the louvers 162. Conventional chlorine tablets 116 are about one inch thick. As the chlorine tablets 116 treat the wastewater, they slowly dissolve and disintegrate, causing the stack of chlorine tablets 116 to shrink in height.

The preferred means for determining the level of the stack of chlorine tablets within a tablet cylinder 106 comprises a first plunger 118 and a second plunger 120 contained therein, defining atop space 122, a middle space 124, and a bottom space 126. The first plunger 118 and the second plunger 120 are made of a malleable material and are connected via a spring 128 located in the middle space 124. In addition, the first plunger 118 may have an optional rubber gasket on its bottom side 130 and the second plunger 120 may also have an optional rubber gasket on its bottom side 132. The use of gaskets ensures that the middle space 124 and the top space 122 remain dry and water-tight. Also in the preferred embodiment, the second plunger 120 has a handle 160 on its top side for grasping. Therefore, when an operator wants to disassemble the tablet cylinder 106 and access the middle space 124 and bottom space 126, he/she can use the handle 160 to remove the first plunger 118, the second plunger 120, and spring 128.

The spring 128 is preferably made of metal to ensure that the proper amount of pressure is exerted on the two plungers 118, 120. In the alternative, the first plunger 118 and the second plunger 120 may be connected by any suspension device, such as a spring weight, hydraulics, and the like.

A plurality of chlorine tablets 116 are stored in the bottom space 126 near the louvers 162, wherein the first plunger 118 rests on the top-most chlorine tablet 116. Wastewater passing through the louvers 162 on the side of the tablet cylinder 106 contacts the chlorine tablets 116 and becomes treated. The spring 128 exerts pressure on the chlorine tablets 116 during treatment to keep them in place, to prevent them from clogging the louvers 162, and to activate a means for indicating the level of chlorine tablets 116 remaining in the tablet cylinder 106.

The preferred means for indicating 134 the level of chlorine tablets 116 remaining in the bottom end 110 of the tablet cylinder 106 comprises a status cylinder 140, about twelve inches in height, having a bottom end and a top end, and a status indicator 138 connected to the top of a status indicator rod 142. The status cylinder 140 is attached to the top end of the tablet cylinder 106 by a collar 150 wherein the collar 150 fits over the top end of the cylindrical pipe 102 and the bottom end of the status cylinder 140 is inserted into the top of the collar 150. The status cylinder 140 is also made of a malleable non-corrosive material, e.g., PVC, however, the preferred status cylinder 140 is clear such that an operator can see inside. A removable cap 136 is attached to the top end of the status cylinder 140 as protection for the internal components.

The status indicator rod 142 is an elongated shaft having a top end and a bottom end that extends from within the status cylinder 140 to the first plunger 118 within the tablet cylinder 106. To accommodate this structure, the status indicator rod 142 passes through a central bore in the second plunger 120 and the removable lid 112 and handle 156 of the tablet cylinder 106, through the collar 150, and through a second means for indicating the level of tablets 116 remaining in the tablet cylinder 106 which is described in greater detail below. The status indicator rod 142 moves freely in the vertical plane between the first plunger 118 and the status cylinder 140.

As the level of chlorine tablets 116 changes, it effects the height of the first plunger 118. That is, when the chlorine tablets 116 dissolve, the stack of chlorine tablets 116 shrinks. Because the first plunger 118 rests on the top of the stack of chlorine tablets 116, the first plunger 118 moves in a downward fashion as the stack shrinks. In turn, the status indicator rod 142 moves in a downward fashion since it is connected to the top of the first plunger 118. Therefore, the status indicator 138 moves downward since it is connected to the top of the status indicator rod 142.

In the preferred embodiment, the status indicator 138 is an elongated rod passing through a central bore in the status indicator rod 142. This is for convenience only. It would be readily apparent for one of ordinary skill in the relevant art to have a status indicator 138 of a different shape, e. g., a disk, a pointer, a flag, etc.

Figure 2:
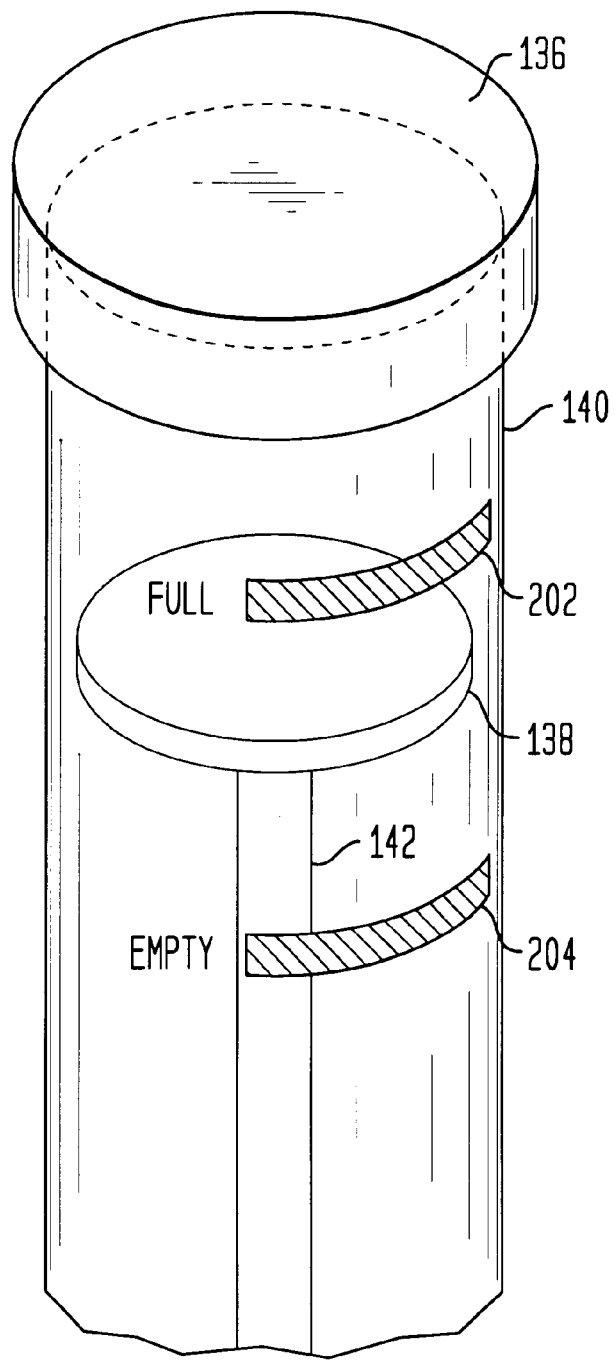
FIG. 2: A perspective side view of a preferred status cylinder of the present invention.

The status cylinder 140 has markings on its side indicating one or more levels of the chlorine tablets 116 remaining in the tablet cylinder 106. FIG. 2 is a perspective side view of a status cylinder 140 of the present invention having two such markings: a full marking 202 indicating that there is a full stack of chlorine tablets 116, and an empty marking 204 indicating that there are no more chlorine tablets 116. The markings may be painted, on adhesive labels or otherwise placed on the side of the status cylinder 140.

In operation, as the status indicator 138 moves up and down within the status cylinder 140, it represents the level of chlorine tablets 116 within the tablet cylinder 106. Therefore, at any time, an operator has a visual representation of the level of chlorine tablets 116. The operator merely has to look at the status cylinder 140 and see the position of the status indicator 138 relative to the markings 202, 204 on the side of the status cylinder 140. This means for visually indicating the level of chlorine tablets 116 eliminates the need for the operator to disassemble the chlorinator system 100 and actually look into the tablet cylinder 106 to see the level of chlorine tablets 116 remaining.

The preferred embodiment of the chlorinator system 100 also comprises a second means for indicating the level of chlorine tablets 116 remaining in the tablet cylinder 106. The second means is an electrical system that works on the same principle of the first means. That is, as the first plunger 118 lowers, an electrical contact is made, thereby completing an electrical circuit. Once the electrical connection is made, an audio sound (e.g. horn, buzzer), visual (lights) or electrical display indicates the low level of chlorine tablets 116.

Specifically, the preferred second means for indicating the level of chlorine tablets 116 comprises a first electrical connector 152, a second electrical connector 154, and an electrical line 158 that is connected to an alarm, e.g., a bell, horn, light, or electrical display. The first electrical connector 152 is attached to the outside edge of a holding platform 148 rigidly attached to the status indicator rod 142. When the status indicator rod 142 moves up or down depending on the level of chlorine tablets 116, the holding platform 148 moves with it. The second electrical connector 154 is rigidly attached to the outside surface of the status cylinder 140 such that the first electrical connector 152 and the second electrical connector 154 are aligned in a vertical plane. Therefore, as the first electrical connector 152 descends, due to the dropping level of chlorine tablets 116, it will contact the second electrical connector 154 when the level of chlorine tablets 116 is either empty or reaches a predefined refill status, e.g., need a refill.

In another embodiment, the present invention is a chlorinator lid assembly comprising the chlorinator system 100 described herein without the tablet cylinder 106. Therefore, an operator can easily adapt any conventional and existing chlorinator to use the present invention by simply removing the existing conventional lid and replacing it with the chlorinator lid assembly of the present invention.

Figure 3:
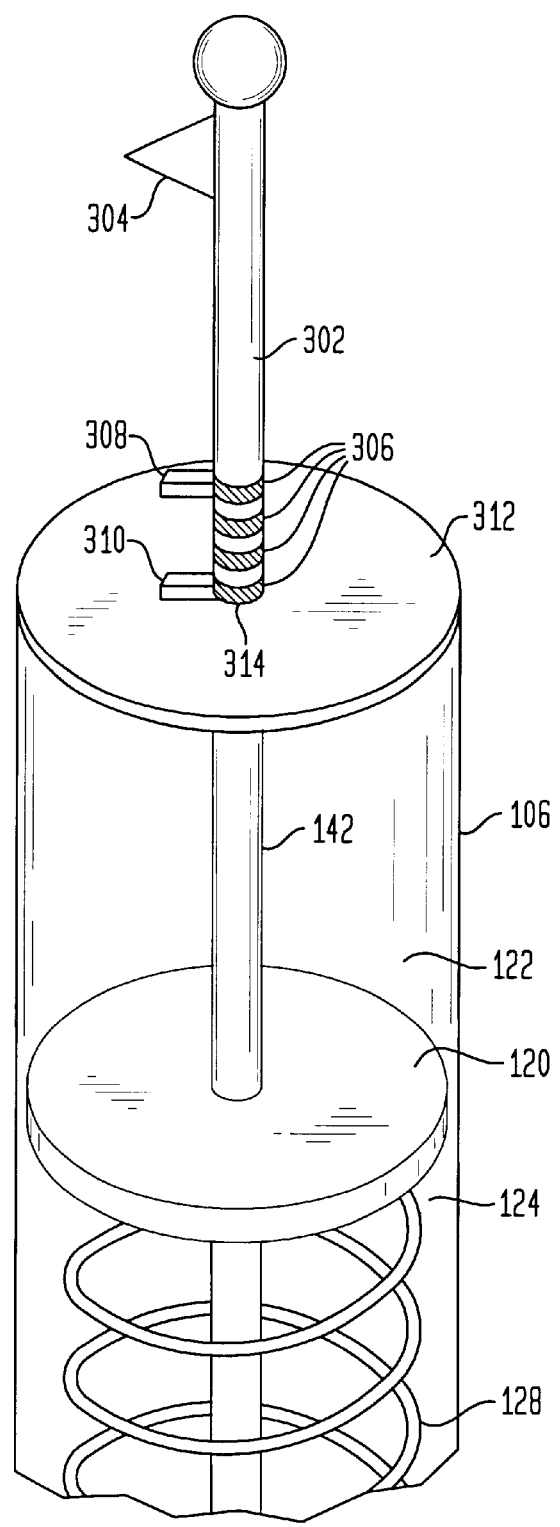
FIG. 3: A perspective side view of an alternative indicator means of the chlorinator system.

FIG. 3 is a simplified, alternative embodiment of the present invention wherein the means for indicating the level of chlorine tablets 106 comprises a lid 312 on the tablet cylinder 106, a status indicator rod 302 passing through a central bore 314 of the lid 312, one or more markings 306 on the status indicator rod 302, a first electrical connector 308, a second electrical connector 310 and a flag 304. Operationally, this embodiment is very similar to the preferred embodiment except that this embodiment is not contained within a status cylinder 140.

As the level of chlorine tablets 116 falls, the status indicator rod 302 descends whereby the markings 306 on the status indicator rod 302 pass through the central bore 314 in the lid 312. An operator retains a visual inspection of the level of chlorine tablets 116 by seeing what marking 306 is positioned at the lid 312 level. In addition, the markings 306 may be one or more colors whereby each color indicates a different level of chlorine tablets 116.

Also as in the preferred embodiment, the second means for indicating the level of chlorine tablets 116 comprises a first electrical connector 308 and a second electrical connector 310. The first electrical connector 308 is rigidly attached to the status indicator rod 302 at a preferred height that corresponds to the maximum number of chlorine tablets 116 stacked in the tablet cylinder 106, e.g., at a height of about eleven or twelve inches. The second electrical connector 310 is rigidly attached to the outside surface of the lid 312 at the central bore 314 such that it is vertically aligned with the first electrical connector 308. Therefore, as the first electrical connector 308 descends with the status indicator rod 302, it will contact the second electrical connector 310 when there are no more chlorine tablets 116 in the tablet cylinder 106. The height of the first electrical connector 308 on the status indicator rod 302 is for convenience only. It would be readily apparent to one of ordinary skill in the relevant art to attach the first electrical connector 308 at a different height, such as a height that indicates a low level of chlorine tablets 116 in the tablet cylinder 106, e.g., about three inches.

All referenced dimensions in the preferred and alternative embodiments are for convenience purpose only. It would be readily apparent to one of ordinary skill in the relevant arts to design and build a chlorinator system 100 of the present invention using different dimensions, e.g., for managing different number of chlorine tablets 116, and to use comparable materials.

In addition, the present invention is described in terms of a chlorinator system 100 for convenience purpose only. The present invention is equally applicable to a de-chlorinator or to any apparatus using a stack of tablets for treating either fresh or waste water. It would be readily apparent for one of ordinary skill in the relevant art to design, manufacture and operate a de-chlorinator other water treatment system using the present invention.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments.

What is claimed is:

1. An apparatus for use in a cylindrical pipe connected to a water supply pipe wherein the apparatus uses a plurality of tablets for treating water flowing through the water supply pipe, comprising:
    a tablet cylinder having a top end, a bottom end with a perimeter, a bottom plate, a cap having a bore to cover said top end of said tablet cylinder, a plurality of louvers positioned around the circumference of said bottom end of said tablet cylinder, and a diameter less than the diameter of the cylindrical pipe wherein said tablet cylinder fits within the cylindrical pipe and the tablets can be stacked within said tablet cylinder;
    a means for determining the level of the stack of tablets within said tablet cylinder, wherein said means for determining the level of the stack of tablets comprises a first plunger positioned in said tablet cylinder, a second plunger positioned in said tablet cylinder, a means for suspending said first plunger and said second plunger, a status indicator rod having a top end movably passing through said cap, said first plunger, and said means for suspending, and attached to said second plunger; and
    a means for indicating the level of the stack of tablets within said tablet cylinder.

2. The apparatus according to claim 1, wherein said means for indicating the level of the stack of chlorine tablets comprises a status cylinder having a top end and a bottom end removably attached to said top end of said tablet cylinder, a cap for covering said top end of said status cylinder, a status indicator rigidly attached to said top end of said status indicator rod, and one or more markings on the side of said status cylinder.

3. The apparatus according to claim 2, further comprising a second means for indicating the level of the stack of chlorine tablets with said tablet cylinder.

4. The apparatus according to claim 3, wherein said second means for indicating comprises a holding platform having an outer edge in contact with said status cylinder and rigidly attached to said status indicator rod within said status cylinder, a first electrical connector rigidly attached to said outer edge of said holding platform, a second electrical connector connected to said perimeter of said bottom end of said status cylinder and in vertical alignment with said first electrical connector, and an alarm connected to said second electrical connector.

5. The apparatus according to claim 4, said alarm being an audible alarm.

6. The apparatus according to claim 4, said alarm being a visual alarm.

7. The apparatus according to claim 1, wherein said means for indicating the level of the stack of chlorine tablets comprises one or more markings on said status indicator rod.

8. The apparatus according to claim 7, further comprising a second means for indicating the level of the stack of chlorine tablets with said tablet cylinder.

9. The apparatus according to claim 8, wherein said second means for indicating comprises a first electrical connector rigidly attached to said status indicator rod above said cap of said tablet cylinder, a second electrical connector connected to said lid of said tablet cylinder positioned at said bore and in vertical alignment with said first electrical connector, and an alarm connected to said second electrical connector.

10. The apparatus according to claim 9 said alarm being an audible alarm.

11. The apparatus according to claim 9 said alarm being a visual alarm.

12. The apparatus according to claim 1, wherein the apparatus is a chlorinator system, the water supply pipe contains wastewater for treatment, and the tablets are chlorine tablets.

13. The apparatus according to claim 1, wherein the apparatus is a de-chlorinator system, the water supply pipe contains wastewater for treatment, and the tablets are tablets for de-chlorinating the wastewater.

14. A lid assembly for use with a tablet cylinder having a top end, a bottom end, a bottom plate, and a plurality of louvers positioned around the circumference of the bottom end of the tablet cylinder, the tablet cylinder being used in a cylindrical pipe connected to a water supply pipe wherein the tablet cylinder uses a plurality of tablets for treating water flowing through the water supply pipe, comprising:
    a lid removably secured to the top end of the tablet cylinder;
    a means for determining the level of the stack of tablets within the tablet cylinder, wherein said means for determining the level of the stack of tablets comprises a first plunger positioned in the tablet cylinder, a second plunger positioned in the tablet cylinder, a means for suspending said first plunger and said second plunger, a status indicator having a top end rod movably passing through said cap, said first plunger, and said means for suspending, and attached to said second plunger; and
    a means for indicating the level of the stack of tablets within the tablet cylinder.

15. The lid assembly according to claim 14, wherein said means for indicating the level of the stack of tablets comprises a status cylinder having a top end and a bottom end removably attached to said top end of the tablet cylinder, a cap for covering said top end of said status cylinder, a status indicator rigidly attached to said top end of said status indicator rod, and one or more markings on the side of said status cylinder.

16. The lid assembly according to claim 15, wherein said means for indicating the level of the stack of tablets comprises one or more markings on said status indicator rod.

17. The lid assembly according to claim 14, further comprising a second means for indicating the level of the stack of tablets with the tablet cylinder.

18. The lid assembly according to claim 17, wherein said second means for indicating comprises a first electrical connector, a means for attaching said first electrical connector to said status indicator rod, a second electrical connector connected in vertical alignment with said first electrical connector at a position that indicates a predefined level of tablets, and an alarm connected to said second electrical connector.

* * * * *